Jan. 26, 1943.  E. J. HIRVONEN  2,309,589
DRILLING MACHINE AND SPINDLE DRIVING MECHANISM
Filed Oct. 11, 1940  4 Sheets-Sheet 1
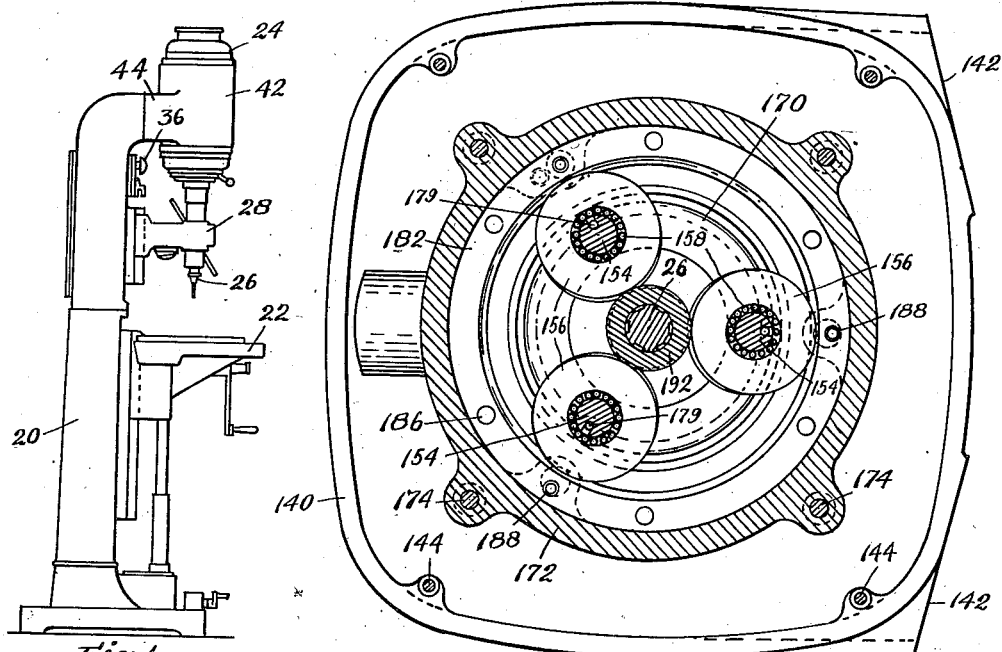
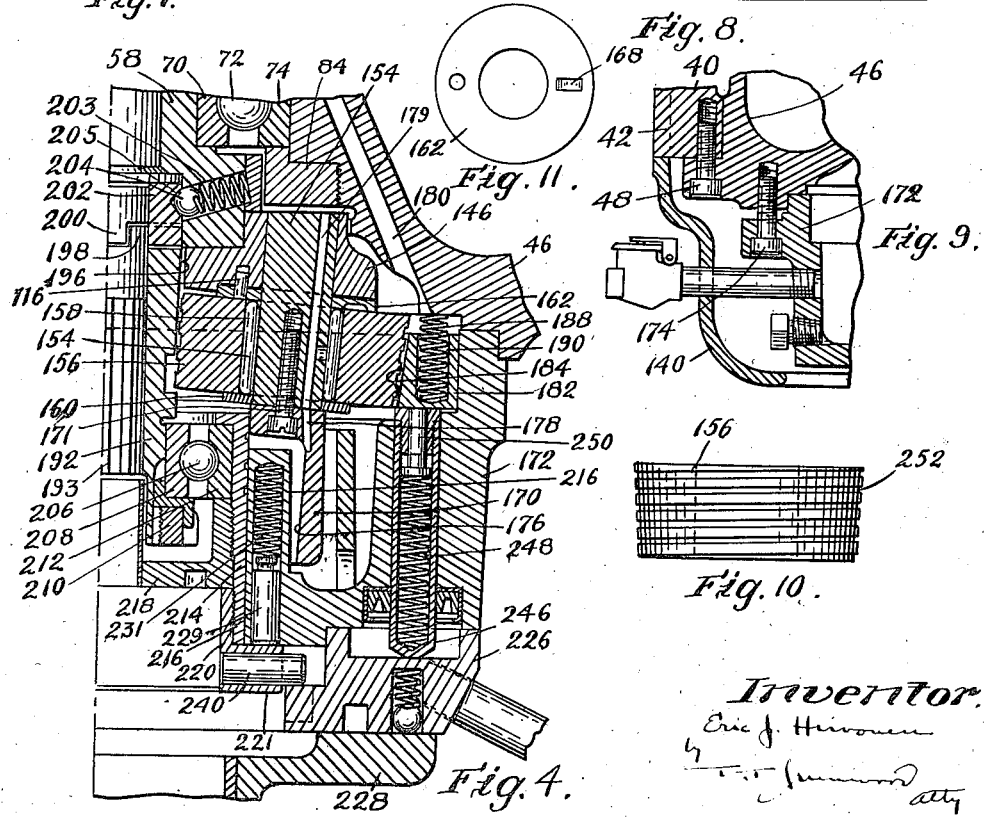
Inventor.
Eric J. Hirvonen

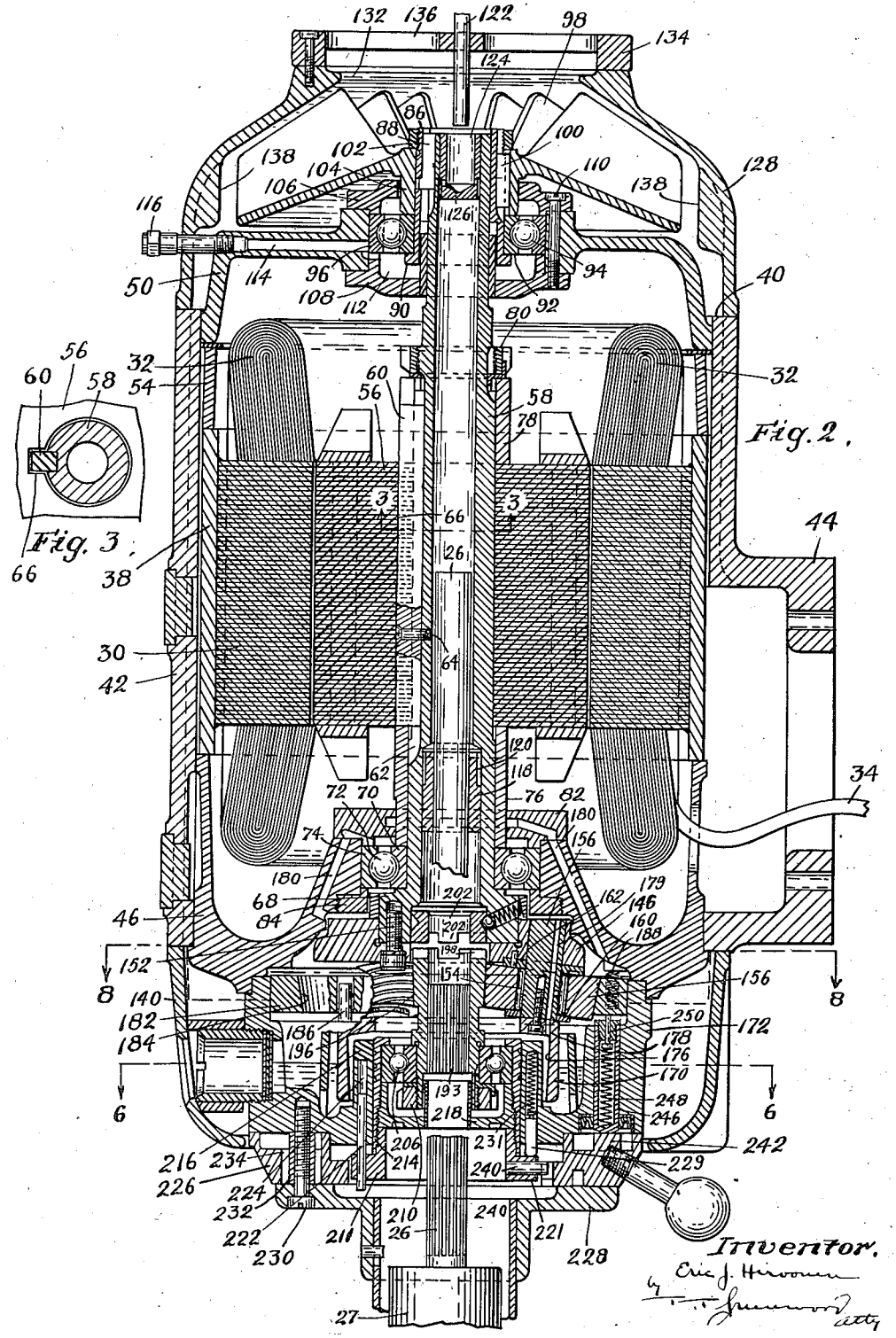

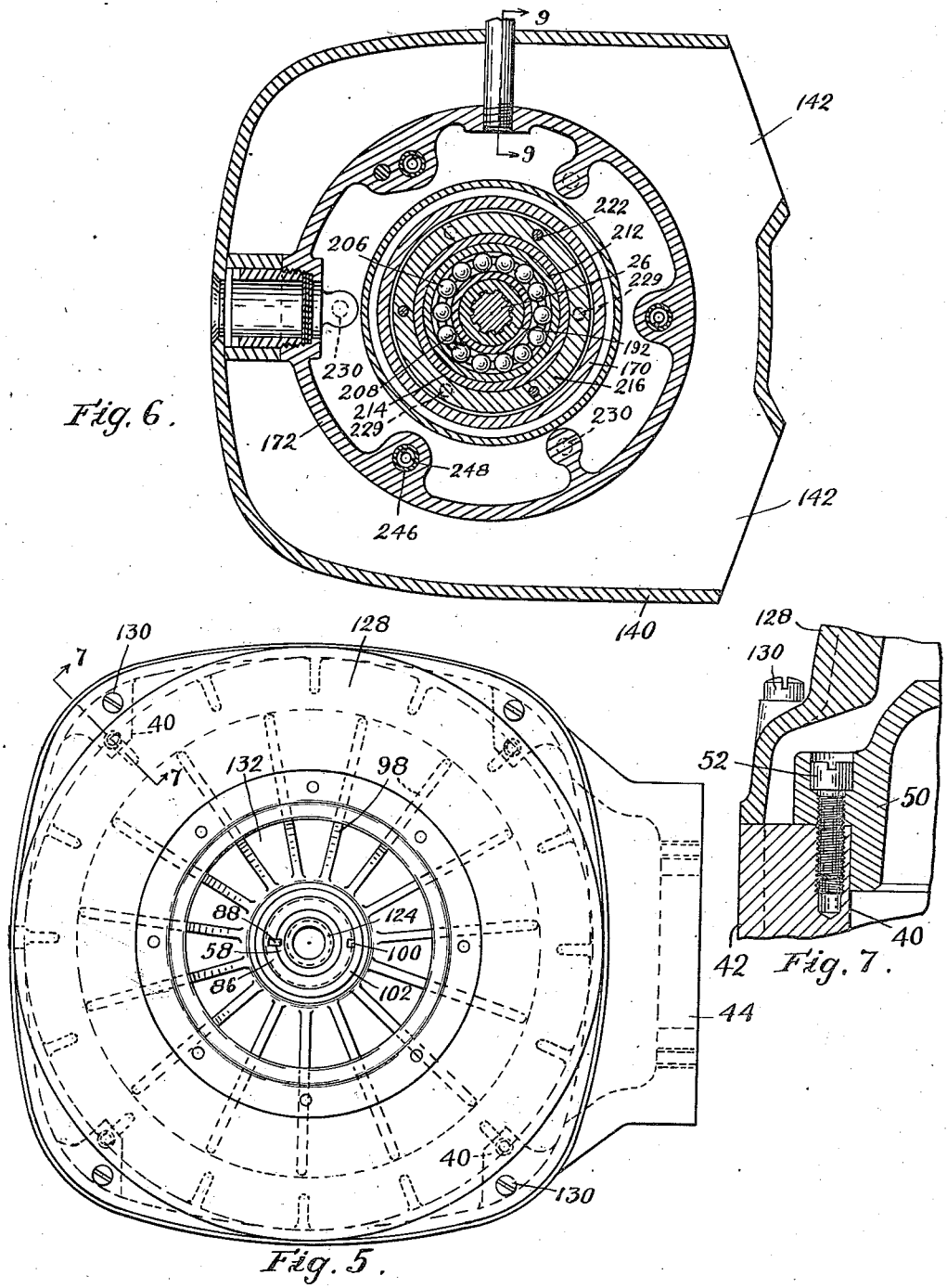

Jan. 26, 1943. E. J. HIRVONEN 2,309,589
DRILLING MACHINE AND SPINDLE DRIVING MECHANISM
Filed Oct. 11, 1940 4 Sheets-Sheet 4

Inventor.
Eric J. Hirvonen

Patented Jan. 26, 1943

2,309,589

UNITED STATES PATENT OFFICE 2,309,589

DRILLING MACHINE AND SPINDLE DRIVING MECHANISM

Eric J. Hirvonen, Worcester, Mass., assignor to Leland-Gifford Company, Worcester, Mass., a corporation of Massachusetts Application October 11, 1940, Serial No. 360,713

31 Claims. (Cl. 74—281)

This invention relates to speed changing mechanism and to machine tools embodying such mechanism.

The invention has particular reference to a multiple speed drilling machine and to a motor driven unitary structure wherein the drill can be rotated at a higher speed than the motor.

One of the objects of the present invention is to provide a drilling machine with a motor driven drill spindle and to improve speed changing apparatus in the connection between the motor and the spindle for increasing the speed of the spindle.

A further object of the invention is the provision of a motor driven drilling machine wherein the motor can be adjusted for different speeds and wherein mechanically operative speed increasing mechanism is employed operative at the will of the operative to increase the speed of the drill spindle over that of the motor for any speed setting of the motor.

A yet further object of the invention is the provision of a motor operated drilling machine having a driving motor for the drill spindle and speed increasing mechanism through which the line of drive between the motor and drill spindle passes at times, the speed changing mechanism having provision for driving the spindle either at the motor speed or at a higher speed at the will of the operative.

Another object of the invention is the provision of a speed changing mechanism of the planetary type having frictionally engaged driving and driven members provided with conical driving surfaces.

A further object is the provision of friction-drive planetary gearing wherein the frictionally engaged driving surfaces are lubricated and wherein provision is made for eliminating the oil film at the region of engagement of the friction surfaces to insure non-slipping driving engagement of such surfaces.

A yet further object of the invention is the provision of a speed changing mechanism of the planetary friction type having cam means for establishing direct driving connection between the driving and driven shafts and also driving connection through the speed changing elements at the will of the operative.

Another object of the invention is generally to improve the construction and operation of drilling machines and speed changing mechanisms.

Fig. 1 is a side elevation of a drilling machine embodying the present invention.

Fig. 2 is an enlarged sectional view of the driving motor and speed changing mechanism, taken along the line of the drive shaft in the vertical fore-and-aft plane of the machine of Fig. 1, the speed changing mechanism being illustrated in the condition for obtaining a high speed of the drill spindle.

Fig. 3 is a sectional detail of the drive shaft and key taken along line 3—3 of Fig. 2.

Fig. 4 is an enlarged sectional detail of the speed changing mechanism taken in the same plane as the Fig. 2 section, but illustrating the elements in the position securing direct connection between the drill spindle and motor shaft.

Fig. 5 is a plan view of the top of the motor of Fig. 2 with the air inlet grill plate removed.

Fig. 6 is a section through a portion of the speed increasing mechanism, taken along line 6—6 of Fig. 2.

Fig. 7 is a sectional detail taken along line 7—7 of Fig. 5, illustrating the manner of bolting the upper bearing supporting housing to the motor frame.

Fig. 8 is a section through the speed increasing mechanism, taken along line 8—8 of Fig. 2.

Fig. 9 is a sectional detail taken along the plane of line 9—9 of Fig. 6, and illustrating the manner of securing the speed mechanism housing and lower motor housing to the motor frame.

Fig. 10 is an elevation of a planetary roll.

Fig. 11 is a plan view of a roll backing washer.

Figure 12:
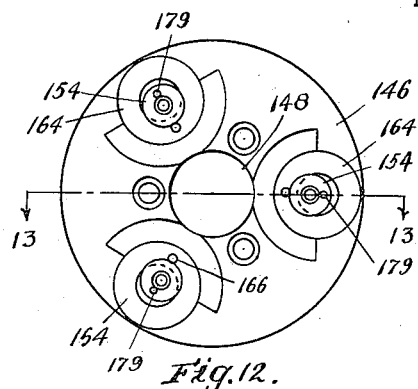
Fig. 12 is a plan view of the planetary roll carrier.

The invention is herein applied to the vertical spindle drilling machine illustrated in Fig. 1, comprising a vertical column 20 that supports a horizontal work supporting table 22, which table is adjustable vertically on the column. A driving electric motor 24 is carried at the upper end of the column and drives a drill spindle 26, the drill being rotatable in a quill 27, Fig. 2, reciprocable in a vertically adjustable bracket 28.

The motor and driving mechanism are illustrated more specifically in Fig. 2. The motor has a stator 30 with multiple speed windings 32 from which taps 34 extend to a circuit changing switch 36, Fig. 1, by which the winding circuits can be changed to condition the motor for rotation of the motor shaft at different speeds in a known manner. The invention, however, does not preclude the use of a single speed motor.

The laminations of the stator 30 are carried by a shell 38 seated within ribs 40, Figs. 2 and 5, of a surrounding motor housing 42 having a rearward extension 44 bolted to the column 20. A lower motor housing member or cover 46 is located within the lower end of the frame and supports the lower end of the stator shell 38, the cover 46 being secured to the end of the motor housing by screws 48, see Fig. 9, that pass endwise into the ends of the ribs 40 of the housing. The motor housing is also provided with a top housing member or cover 50 which is received within the ribs of the housing and is secured thereto by screws 52, see Fig. 7, which screws pass endwise into the upper ends of the housing ribs 40. In the particular illustration shown, a spacer ring 54 is interposed between the lower end of the upper cover 50 and the upper end of the stator shell 38 to maintain the stator clamped in position between the upper and lower covers. The dimensions of the parts are such that the housing is also adapted to receive the longer stator of a more powerful motor which has a shell that extends to the upper cover, in which event the spacer ring 54 is eliminated.

The motor includes a rotor 56 fixed to a hollow motor shaft 58 by a key 60 that is received in a longitudinal key-way 62 of the motor shaft and is secured therein by suitable means as the screw 64, the key being positioned in a key-way 66 of the rotor. The motor shaft 58 passes through the lower cover 46 and is provided with a radially outstanding flange or enlarged head 68 at its lower end. The inner race 70 of an anti-friction or ball bearing 72 is received on the shaft and is seated against the head. The outer race 74 of the bearing is carried by the inner bore of the lower cover 46. A spacer sleeve 76 is on the shaft above the race 70 and between it and the rotor 56. A spacer sleeve 78 is on the shaft above the rotor core. A clamping nut 80 is screw-threaded on the shaft and exerts endwise pressure on the sleeve 58, the rotor 56, the sleeve 76 and the race 70, thereby to clamp the core and inner race against the enlarged head of the shaft and hence against endwise displacement on the shaft.

The anti-friction bearing 72 is provided with a cover 82 which is suitably secured to the lower cover 46. The outer race 74 is clamped between said cover and a clamping disc 84 that is screw-threaded into the lower cover 46.

The motor shaft passes through the upper cover 50 and has a sleeve 86 fixed thereto by a key 88. The lower end of the sleeve is provided with a radially outstanding annular shoulder 90 upon which is seated the inner race 92 of a ball or anti-friction bearing 94 having an outer race 96 that is seated in the bore of the cover 50. The shaft sleeve 86 has a centrifugal fan or impeller 98 fixed thereto by a key 100. A nut 102 is screw-threaded on the outer end of the sleeve and presses the hub 104 of the impeller against the inner race 92, thereby to clamp the impeller and the race against axial displacement. A cover 106 encloses the upper end of the bearing bore and a second cover 108 closes the lower end of the bearing bore, the two covers being secured together and to the motor cover 50 by suitable means as screws 110, the covers also clamping between them the outer race 96, thereby to hold the race against axial displacement. The lower bearing cover 108 and a part of the bearing bore of the motor cover 50 constitutes an oil retaining chamber 112 for supplying lubricant to the bearing, the lubricant being admitted through a radial passage 114 terminating in a suitable externally ending oiling device 116.

The drill spindle 26 is vertically movable within the hollow bore of the motor shaft 58 and for drilling machines having a long movement of the drill spindle the upper end of the drill spindle is rotatably supported in a bearing bushing 118 vertically retained within the bore of the motor shaft. The bearing bushing 118 preferably is of the porous metal and oil retaining type and is provided with an annular oil retaining channel 120 surrounding its upper part and between it and the motor shaft. The channel receives oil through the upper end of the motor spindle by means of oil introduced through the oiling pipe 122. The oil from the pipe flows into a cup 124 inserted in the upper end of the motor bore and provided with side openings 126 through which the oil can flow onto the inner side wall of the motor shaft and thence downwardly along the side wall into the channel 120.

Figure 17:
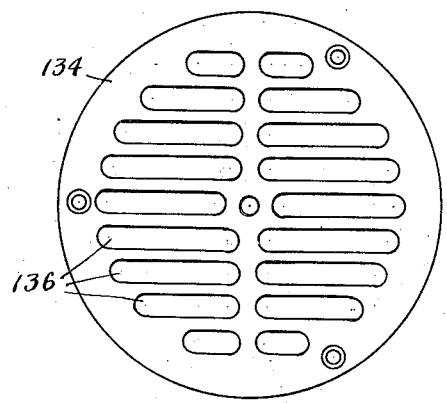
Fig. 17 is a plan view of the air inlet grill plate of Fig. 2.
Figure 13:
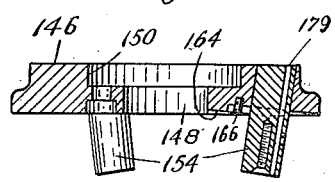
Fig. 13 is a sectional view of the roll carrier taken along line 13—13 of Fig. 12.

The motor housing is provided with a fan cover 128 which is seated on the top of the motor housing 42 and secured thereto by screws 130, see Fig. 5. The fan cover is provided with a circular opening 132 in its upper end traversed by a grill plate 134 having air inlet openings 136, see also Fig. 17. The inner wall of the fan cover is provided with vertical air guiding ribs 138 which confront the lips of the vanes of the impeller and guide the air to flow downwardly within the generally rectangular motor housing 42 and between it and the cylindrical stator shell 38 and to pass around the sides of the lower motor cover 46 and thereunder into a lower air housing 140 and thence rearwardly and out of the air inlet ducts 142, see especially Fig. 6.

The lower air housing 140 is clamped against the lower end of the motor housing my suitable means as the screws 144, see Fig. 8, that are screw-threaded into the lower end of the housing ribs 40.

The lower end of the motor shaft 58 carries and is fixed rigidly to and drives a planetary roll carrier 146, see Figs. 2, 4, 12 and 13. Said roll carrier comprises a disc having a central passage 148 and concentric therewith an internal annular recess 150 in which is located the portion of the head 84 of the motor shaft. The disc is secured to the motor shaft by screws 152 which pass through the disc and are screw-threaded into the end of the head 68.

The disc carries three roll supporting pins or stud shafts 154, the similar ends of which project from the lower face of the disc. It is a feature of this invention that the pins are inclined downwardly and inwardly toward the axis of the disc a suitable amount. A 4° angle of inclination is quite satisfactory. Each of the three pins 154 rotatably supports a conical planetary wheel or roll 156 which is larger at the top face than at the bottom face so that the periphery of the roll is tapered with respect to the axis of the pin and the confronting peripheral regions of the three rolls are also tapered, the space between the three rolls being larger at the top of the rolls than at the bottom.

The rolls are journalled on the pins by anti-friction bearings, herein specifically shown as needle rolls 158. The rollers are held in place by washers 160 which surround the lower ends of the pins and overlie the lower ends of the needle rollers. Washers 162 are also interposed between the upper ends of the needle rollers and the carrier plate 146, which washers surround the pins 154 and are located in recesses 164 of the carrier plate and are held against rotation each by a pin 166 that extends through a hole in the associated washer. Each washer is provided with a radial oil groove, 168, see also Fig. 11, the inner end of the oil groove, however, being terminated outwardly of the rounded upper ends of the rollers so that the rollers will not catch in the groove.

The three sets of washers and rollers are held on their pins by an annular ring or oil raising cup 170 which is secured by screws 171 to the ends of the pins. The cup depends into a body of lubricating oils contained in a speed changing housing 172 attached to the lower face of the lower motor cover plate 46 by screws 174, as is illustrated in Fig. 9. The inner face 176 of the oil throwing cup is tapered upwardly and outwardly or is largr at the top than at the bottom so that as the cup rotates the oil is carried up the cup by centrifugal force and passes through aligned passes 178 of the cup and the pins 154 to the upper face of the carrier plate 146. Oil is thrown from the carrier plate and forced into an upwardly extending passage 180 of the motor cover 46 and thence into the space above the bearing 72 for the lubrication of said bearing. The roll bearings are supplied with lubricant through lateral passages 179 of the pin passages 178.

A stationary planetary friction ring 182 is located in the upper end of the speed changing housing 172 in line with the planetary rolls 156 and has a conical tapered inner driving face 184 that conforms with the taper of the faces of the rolls and at times is adapted to be in frictional driving engagement with the rolls. Said ring 182 is free for movement in a vertical direction and is held against rotation by a plurality of vertical pins 186 which are located loosely in vertical passages in the ring and are fixed in the speeder housing 172. The ring is urged constantly in a downward direction by springs 188 which bear against the lower motor cover 46 and the ring 182 and are located partly in recesses 190 in said ring.

The planetary rolls 156 drive a short high speed or driven shaft 192 which surrounds the drill spindle 26 and has an axially splined connection 193 therewith by which it is free for movement axially of the drill spindle. Said shaft 192 is located between the rolls and has a conical or tapered upper portion 196 that at times is in driving engagement with the rolls. The upper end of the high speed shaft is provided with clutch teeth 198 which can engage complementary clutch teeth 200 of a ratchet clutch ring 202 received in a recess in the lower end of the motor shaft and releasably connected for driving engagement therewith by spring pressed balls 204, one of which is illustrated in Fig. 2, the balls being seated in peripheral depressions 203 of the ring and partly in passages 205 of the motor shaft.

The lower part of the high speed or driven shaft carries an anti-friction or roller bearing 206, the inner race 208 of which is clamped to the shaft by a nut 210 and the outer race 212 of which is seated in a bushing 214. Said bushing is movable axially with the high speed shaft and is axially loosely located in a hub 216 of the speeder housing 172. An end cap 218 is screw-threaded within the bushing and bears against the lower end of the outer race and an end bushing 211 is screw-threaded into the sleeve 214 and is seated on the end cap. The bearing assembly and the bushing 211 are held against rotation while free for vertical movement by pins 222 fixed in the bushing 211 parallel with the axis of the shaft and movable axially in recesses 224 of the speeder housing 172. The high speed drive shaft 192 and the associated bearing assembly are urged constantly in a downward or roll engaging direction by spring pressed plungers 229 movable vertically in the speeder housing 172 and urged by springs 231 against the outstanding flange 221 of the bushing 211.

Figure 14:
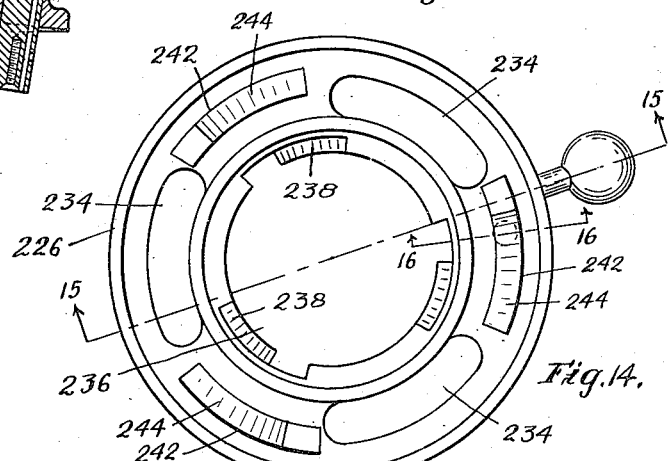
Fig. 14 is a plan view of the shifter cam for the speed changing mechanism.
Figure 15:
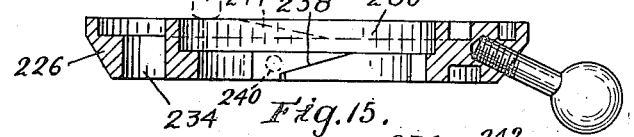
Fig. 15 is a sectional view taken along line 15—15 of Fig. 14.
Figure 16:
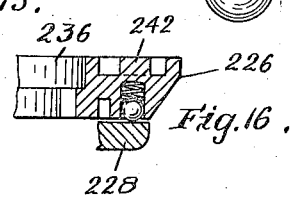
Fig. 16 is a sectional detail of a shifter cam supporter ball taken along line 16—16 of Fig. 14.

Mechanism is provided by which the high speed shaft can be moved upwardly to engage the ratchet clutch 202 so that the drill spindle 26 is driven at the motor speed and to move the planetary ring 182 downwardly to free it from driving engagement with the planetary rolls 156; and also to move the high speed shaft downwardly into driving engagement with the planetary rolls 156 and to move the ring 182 upwardly into driving engagement with the rolls. Said mechanism includes an angularly shiftable cam plate 226, see Figs. 1, 4, 14, 15 and 16. Said cam plate is located between the lower end of the speeder housing 172 and a lower end plate 228, said lower plate being secured to the speeder housing by screws 230 and spaced therefrom by spacer sleeves 232 which are located in arcuate slots 234 of the cam plate so that the cam plate is thus free for angular movement. The cam plate has a central passage 236 therethrough and inclined cam sections 238 peripherally disposed about said passage. The bushing 211 forming a part of the axially movable drive shaft bearing assembly has radially disposed outwardly extending pins 240, each of which is adapted to engage one of the cam sections 238 of the cam ring. Thus by rotating the cam ring in a counter-clockwise direction, Fig. 14, the cam sections engage the pins 240 and elevate them and the high speed drive shaft, freeing the shaft from engagement with the planetary pinion roll and placing it in driving connection with the clutch 202.

Said cam ring is also provided with circumferentially extended sets of arcuate cam ribs 242 having upwardly inclined top walls 244 which engage the lower ends of vertical tubular members 246 vertically movable in passages through the speeder housing 172 under the planetary ring 182. Said tubular members contain compression springs 248 which bear against the lower ends of pins 250, the upper ends of which bear against the lower radial face of the cam ring 182, said springs 248 being stiffer than the springs 188 that act in the opposite direction on the planetary ring. Thus when the cam ring is shifted in a clockwise direction, Fig. 14, the tubular members 246 are moved upwardly by the cams 242 and through the springs 248 raise the planetary ring upwardly into engagement with the planetary rolls and hold the ring in such engagement by pressure of the springs 248. The high speed shaft is also held in driving engagement with the planetary rolls by pressure of the springs 231. The sets of springs 231 and 248 automatically take up any wear that may occur between the conical driving faces.

The operation of the cam ring is such that shifting the cam ring in one direction lowers the high speed shaft and raises the planetary ring and thereby conditions the speed increasing mechanism to drive the high speed shaft and the drill spindle at increased speed through the friction gearing. Movement of the cam ring in the opposite direction lowers the planetary ring away from driving engagement with the planetary rolls and raises the high speed shaft to effect its driving engagement with the motor shaft and its rotation at the speed of the motor shaft. The clutch ring 202 is designed to be rotated free from the motor shaft at the moment the high speed shaft engages it and at the time the freely rotating high speed shaft is rotating at a high speed with the motor shaft. When the speed of the high speed shaft slows down to the speed of the motor shaft the clutch ring becomes clutched to the motor shaft and transmits the normal power therethrough.

All driving parts of the planetary mechanism are constantly lubricated during the operation of the mechanism and an important feature of the invention is that the planetary rolls 156 are provided with grooves 252 in their driving periphery, the grooves being essentially a spiral thread. By the provision of such a groove the oil film on the driving surfaces is allowed to flow away from the engaging regions of these surfaces so as to effect and maintain firm, non-slipping driving engagement with the surfaces.

The taper of the driving surfaces of the high speed shaft, the planetary rolls and the planetary ring not only provide for movement of the shaft and ring on the roll engaging and disengaging directions, but also permit a wedging action between the parts which maintains them in firm, non-slipping driving engagement when the parts are set for driving engagement.

I claim:

1. Speed changing mechanism including a driving shaft, a planetary carrier driven by said shaft, conically faced planetary friction rolls carried by said carrier, a driven shaft having frictional driving engagement with said rolls, a stationary planetary ring surrounding and having a conical face in direct frictional driving engagement with the conical faces of said rolls, manual means for urging said conical faces axially into driving engagement and means to supply lubricant to the driving faces of said driven shaft rolls and ring, the faces of said rolls having circumferential grooves, and the grooves forming escape passages for the lubricant between the contacting surfaces of said rolls with said driven shaft and ring and providing non-slipping engagement between said elements.

2. In a speed changing mechanism of the planetary type, a driven element having a conical driving surface, a planetary ring having a conical driving surface, a planetary carrier having planetary friction rolls provided with conical driving surfaces engaged and in driving relation with the conical surfaces of said driven element and ring, a drive shaft for the planetary carrier, means providing for direct drive between said drive shaft and driven element, said conical driving surfaces of said driven element, ring and rolls being at a small angle with the axis of the driven element by which the surfaces can be held in firm frictional driving engagement, and means for moving the driven element to disengage the conical driving surface thereof from the planetary friction rolls and to establish direct drive between said driven element and said drive shaft.

3. Planetary speed changing mechanism comprising a driving shaft, a driven shaft, a planetary roll carrier driven by said driving shaft, planetary rolls carried by said carrier surrounding and in frictional driving engagement with said driven shaft, a stationary planetary ring surrounding said rolls and having a driving surface in frictional driving engagement with said rolls, the driving surfaces of said driven shaft, rolls and ring being conical, means to urge said driven shaft in a direction to force its conical driving face against the driving faces of said rolls, separate and independently acting means to force the conical driving face of said ring against the driving faces of said rolls, and a manually operated control member for said last two means and common to both.

4. Planetary speed changing mechanism comprising a driving shaft, a driven shaft, a planetary roll carrier driven by said driving shaft, planetary rolls carried by said carrier surrounding and in frictional driving engagement with said driven shaft, a stationary planetary ring surrounding said rolls and having a driving surface in frictional driving engagement with said rolls, the driving surfaces of said driven shaft, rolls and ring being conical, spring means constantly urging said driven shaft axially in a direction to engage said rolls, and spring means separate from said first spring means constantly urging said ring axially in a direction to engage said rolls.

5. In a planetary speed changing transmission, the combination of a plurality of planetary rolls, a driving element for said rolls, a driven shaft located between and engaged with said rolls, said driven shaft and driving element having means for direct driving connection, a ring surrounding and engaged with said rolls, said rolls and said shaft and ring having conical frictionally engaging driving surfaces, and means under the control of the operator for moving said shaft and ring axially into and out of engagement with said rolls, said means being operative also directly to connect the driving element and the shaft upon disengagement of the shaft and ring from the rolls.

6. In a planetary speed changing transmission, the combination of a plurality of planetary rolls, a shaft located between and engaged with said rolls, a ring surrounding and engaged with said rolls, said rolls and said shaft and ring having conical frictionally engaging driving surfaces, and independent spring means acting on said shaft and ring operative to urge them separately into driving engagement with said rolls.

7. Speed changing mechanism including a driving shaft, a driven shaft, means providing for direct driving connection between said shafts, a planetary carrier driven by the driving shaft, planetary friction rolls carried by the carrier, a stationary planetary ring engaged by said friction rolls, and means for moving said driven shaft out of driving engagement with said rolls and into direct driving engagement with said driving shaft.

8. Speed changing mechanism including a driving shaft, a driven shaft, means providing for direct driving connection between said shafts, a planetary carrier driven by the driving shaft, planetary friction rolls carried by the carrier, a stationary planetary ring engaged by said friction rolls, and means under the control of the operative for moving said planetary ring out of driving engagement with said rolls and to move said driven shaft into direct driving engagement with said driving shaft.

9. In a planetary gearing, a center shaft, an outer planetary ring, planetary friction rolls between and adapted for frictional driving engagement with both said ring and shaft, said rolls having conical driving surfaces and said shaft and ring having corresponding conical driving surfaces, spring means applying pressure on said shaft and ring in a direction to move said shaft and ring into engagement with said rolls, and a control member associated with said shaft and rolls for moving them in directions to free the shaft from driving engagement with said rolls.

10. In a planetary gearing, a center shaft, an outer planetary ring, planetary friction rolls between and adapted for frictional driving engagement with both said ring and shaft, said rolls having conical driving surfaces and said shaft and ring having corresponding conical driving surfaces, supporting means for said shaft and ring by which both are free for movement toward and away from driving engagement with said rolls, and a control member common to both shaft and ring operative to effect movements of said shaft and ring in roll engaging and disengaging directions.

11. In a planetary gearing, a center shaft, an outer planetary ring, planetary friction rolls between and adapted for frictional driving engagement with both said ring and shaft, said rolls having conical driving surfaces and said shaft and ring having corresponding conical driving surfaces, supporting means for said shaft and ring by which both are free for movement toward and away from driving engagement with said rolls, separate spring means for urging said shaft in one direction into driving engagement with said rolls and said ring in the opposite direction into driving engagement with said rolls, and a common control member for both said shaft and ring operative to move said shaft and ring in opposite directions against said spring means away from driving engagement with said rolls.

12. Planetary gearing comprising a driving shaft, a pinion carrier driven by said shaft, planetary wheels carried by said carrier, a planetary ring surrounding and engaged with said wheels, a driven shaft coaxial with said driving shaft located between and normally in engagement with said wheels, and means for moving said driven shaft axially to disengage it from driving engagement with said wheels and to place it in direct driving engagement with said driving shaft.

13. Planetary gearing comprising a driving shaft, a planetary carrier driven by said shaft, planetary wheels carried by said carrier, a stationary planetary ring surrounding and in driving engagement with said wheels, a driven shaft coaxial with said driving shaft and located between and in normal driving engagement with said wheels, said driving and driven shafts having provision for clutching engagement, and means for moving said driven shaft axially out of driving engagement with said wheels and into clutching engagement with said driving shaft.

14. Planetary gearing including axially aligned driving and driven shafts, planetary gearing elements for connecting said shafts for the rotation of said driven shaft under a different condition than said driving shaft, clutch mechanism for directly connecting said shafts for rotation of said driven shaft under the same conditions as said driving shaft, and means for effecting axial movement of said driven shaft in a direction to free it from driving engagement with said planetary gearing elements and for effecting its clutching engagement with said driving shaft.

15. Planetary gearing comprising a driving shaft, a planetary carrier rotatable with said shaft, planetary friction rolls carried by said carrier, a stationary planetary ring surrounding and in frictional engagement with said rolls, a driven shaft coaxial with said driving shaft located between and adapted for frictional driving engagement with said rolls, said driving shaft having a clutch member provided with a releasable driving engagement with said shaft, said driven shaft having clutching means engageable with said clutch member, and means for moving said driven shaft axially to free it from driving engagement with said rolls and place it in driving connection with said clutch member.

16. Planetary gearing comprising a driving shaft, a pinion carrier driven by said shaft, planetary friction rolls carried by said carrier, a stationary planetary ring surrounding and in frictional driving engagement with said rolls, a driven shaft located between and having frictional driving engagement with said rolls and arranged coaxially with said driving shaft, and a third shaft extended coaxially through said driven shaft and having a driving connection therewith constraining driven and third shafts against independent rotation but permitting relative axial displacement therebetween, said third shaft being movable axially independently of said driven shaft.

17. Planetary gearing comprising a driving shaft, a pinion carrier driven by said shaft, planetary friction rolls carried by said carrier, a stationary planetary ring surrounding and in frictional driving engagement with said rolls, a driven shaft located between and having frictional driving engagement with said rolls and arranged coaxially with said driving shaft, a third shaft extended coaxially through said driven shaft and having a driving connection therewith constraining driven and third shafts against independent rotation but permitting relative axial displacement therebetween, said third shaft being movable axially independently of said driven shaft, and means for moving said driven shaft axially independently of said third shaft.

18. Planetary gearing including a driving shaft, a planetary carrier driven by said shaft having friction rolls provided with conical frictional driving surfaces, a stationary planetary ring surrounding said rolls and having a conical face in driving engagement with said rolls, a hollow driven shaft coaxial with said driving shaft located between and having a conical driving surface engaged by said rolls, a third shaft extended within and having a driving connection with and movable axially independently of said driven shaft, and means for moving said driven shaft independently of said third shaft in a direction to free it from driving engagement with said rolls.

19. Planetary gearing comprising a hollow motor shaft, a planetary carrier carried by and rotatable with said motor shaft, planetary rolls carried by said carrier having conical driving surfaces, a stationary planetary ring surrounded and engaged by said rolls, a hollow driven shaft located between said rolls and having a conical driving surface engaged by said rolls, a drill shaft movable axially within said driving and driven shafts and having an axially splined driving connection with said driven shaft, and means for moving said driven shaft axially in a direction to free it from driving engagement with said rolls.

20. Planetary gearing comprising a hollow motor shaft, a planetary carrier carried by and rotatable with said motor shaft, planetary rolls carried by said carrier having conical driving surfaces, a stationary planetary ring surrounded and engaged by said rolls, a hollow driven shaft located between said rolls and having a conical driving surface engaged by said rolls, a drill shaft movable axially within said driving and driven shafts and having an axially splined driving connection with said driven shaft, means for moving said driven shaft axially in a direction to free it from driving engagement with said rolls, and means providing a clutch connection between said driven and driving shafts in the roll-free position of said driven shaft.

21. Planetary gearing comprising a hollow motor shaft, a planetary carrier carried by and rotatable with said motor shaft, planetary rolls carried by said carrier having conical driving surfaces, a planetary ring surrounding and engaged by said rolls, means for holding said ring against rotation while providing axial movement of said ring, a hollow driven shaft located between said rolls and having a conical driving surface engaged thereby, a drill shaft movable axially within said driving and driven shafts and having an axially splined driving connection with said driven shaft which permits axial movement of said drill shaft independently of corresponding movement of said driven shaft, and means for moving said driven shaft and planetary ring axially into and out of cooperative engagement with said planetary rolls.

22. Planetary gearing comprising a driving shaft, a planetary carrier driven by said shaft, conically faced planetary rolls on said carrier, a planetary ring in driving engagement with the conical faces of said rolls, means for holding said ring against rotation, a conically faced driven shaft located between and engageable with said rolls, a fixed support, a bearing providing rotatable support for said driven shaft, said bearing being carried by and being movable axially of said shaft in said support, and means for moving said bearing and shaft axially to move said driven shaft into and out of driving engagement with said rolls.

23. Planetary gearing including a driving shaft, a planetary carrier rotatable with said shaft, conically faced planetary rolls carried by said carrier, a planetary ring surrounding and engageable with the conical faces of said rolls, a conically faced driven shaft located between and engageable with said rolls, a fixed housing for said gearing, means supporting said planetary ring against rotation and for axial movement in said housing, a bearing support for said driven shaft carried by said housing and supported for axial movement therein, a cam member angularly movable on said housing, and connections between said cam member and said bearing support and said ring for moving them axially into and out of driving engagement with said rolls.

24. Planetary gearing including a driving shaft, a planetary carrier carried by and rotatable with said shaft, conically faced planetary rolls carried by said carrier, a planetary ring engageable with the conical faces of said rolls, a driven shaft disposed between said rolls and having a conical driving face for engagement with the conical faces of said rolls, a fixed housing for said gearing, means connecting said ring with said housing against rotation of said ring and permitting axial movement thereof, spring means acting on said ring in a direction tending to move it from driving engagement with said rolls, a bearing support for said driven shaft carried by said housing and movable axially therein, spring means acting on said bearing support in a direction to urge said driven shaft into engagement with said rolls, an angularly shiftable cam member rotatable on said housing, and connections between said cam member and said bearing support and cam ring for moving said cam ring and said driven shaft axially in opposition to the thrust of said spring means.

25. Planetary gearing including a driving shaft, a planetary carrier fixed thereto having roll supporting pins projecting therefrom at an inclination to the axis of said driving shaft, conically faced planetary rolls rotatable on said pins, a non-rotatable axially shiftable conically faced planetary ring surrounding and adapted for engagement with the conical faces of said rolls, a conically faced driven shaft located within and adapted for engagement with the driving faces of said rolls, and means for shifting said ring and driven shaft axially into and out of driving engagement with said rolls.

26. Planetary gearing including a vertical driving shaft, a planetary carrier fixed thereto having downwardly projecting pins, planetary friction wheels on said pins, a non-rotatable planetary ring having a friction surface engaged with said wheels, a driven shaft located between and having a friction face engaged with said wheels, a housing member located below said wheels providing a lubricant reservoir adapted to contain a body of lubricant below and out of contact with the gearing elements, an oil cup fixed to the ends of said wheel pins and dipping into said reservoir, and lubricant passages between the interior of said cup and said pins.

27. Planetary gearing including vertically aligned driving and driven shafts, planetary gearing elements frictionally connecting said shafts including a planetary carrier driven by said driving shaft, means providing a lubricant reservoir beneath said carrier adapted to contain a body of lubricant below and out of contact with the gearing elements, an oil raising cup fixed to and rotatable with said carrier dipping into said oil reservoir, and lubricant passages leading from the interior of said cup and through said carrier.

28. Planetary gearing including a vertical driving shaft having a bearing at the lower end part thereof, a lower driven shaft aligned with said driving shaft, planetary friction gearing elements operatively connecting said shafts, means providing an oil reservoir located beneath said gearing elements adapted to contain a body of lubricant below and out of contact with the gearing elements, and means including a rotatable oil raising cup rotatable with one of the aforesaid gearing elements dipping into said oil reservoir and raising oil therefrom and conducting the oil upwardly through the gearing to said bearing.

29. A speed changing unit for drills comprising a driving motor having a housing, a motor therein, a vertical motor shaft, upper and lower housing covers for said housing providing bearing supports for said motor shaft, a gearing housing fixed to and projecting below the lower motor housing cover, a planetary carrier fixed to and rotatable with said motor shaft having conically faced driving rolls, a hollow driven shaft coaxial with said motor shaft disposed between and adapted to be in driving engagement with said planetary rolls, a bearing support for said driven shaft carried by said gearing housing, a drill spindle vertically movable within said motor and driven shafts and having an axially splined connection with said driven shaft, a planetary ring stationarily carried by said gearing housing and in driving engagement with said rolls, said bearing support for said driven shaft being movable axially within said gearing housing for moving said driven shaft into and out of driving engagement with said rolls, said planetary ring being movable axially in said gearing housing into and out of driving engagement with said rolls, and an angularly shiftable cam member rotatable on said gearing housing having connections with said bearing support and said planetary ring for moving said driven shaft and ring into and also out of driving engagement with said rolls.

30. A speed changing unit for drills comprising a driving motor having a housing, a motor therein, a vertical motor shaft, upper and lower housing covers for said housing providing bearing supports for said motor shaft, a gearing housing fixed to and projecting below the lower motor housing cover, a planetary carrier fixed to and rotatable with said motor shaft having conically faced driving rolls, a hollow driven shaft coaxial with said motor shaft disposed between and adapted to be in driving engagement with said planetary rolls, a bearing support for said driven shaft carried by said gearing housing, a drill spindle vertically movable within said motor and driven shafts and having an axially splined connection with said driven shaft, a planetary ring stationarily carried by said gearing housing and in driving engagement with said rolls, said bearing support for said driven shaft being movable axially within said gearing housing for moving said driven shaft into and out of driving engagement with said rolls, said planetary ring being movable axially in said gearing housing into and out of driving engagement with said rolls, and an angularly shiftable cam member rotatable on said gearing housing having connections with said bearing support and said planetary ring for moving said driven shaft and ring into and also out of driving engagement with said rolls, said driven shaft and said motor shaft having engageable clutch means and said clutch means being engageable when said driven shaft is free from driving engagement with said rolls to establish direct driving connection between said motor shaft and drill spindle.

31. In a planetary speed increasing mechanism, a driving shaft, a driven shaft, planetary gearing connecting said shafts including a planetary gear carrier driven by said driving shaft, planetary friction rolls carried by said carrier, a non-rotatable ring in normal friction engagement with said rolls, an element of said driven shaft engaged by said rolls, and means connecting said shafts directly for drive of said shafts at equal speeds and excluding said planetary gearing from the line of drive including means for moving said ring out of engaging relation of said rolls.

ERIC J. HIRVONEN.